(12) United States Patent
He et al.

(10) Patent No.: US 11,328,008 B2
(45) Date of Patent: *May 10, 2022

(54) QUERY MATCHING TO MEDIA COLLECTIONS IN A MESSAGING SYSTEM

(71) Applicant: Snap Inc., Santa Monica, CA (US)

(72) Inventors: Xinran He, Los Angeles, CA (US); Jie Luo, Marina Del Rey, CA (US); Sushobhan Nayak, Marina del Rey, CA (US); Zhou Ren, Bellevue, WA (US); Christophe Jacky Henri Van Gysel, Amsterdam (NL)

(73) Assignee: Snap Inc., Santa Monica, CA (US)

( * ) Notice: Subject to any disclaimer, the term of this patent is extended or adjusted under 35 U.S.C. 154(b) by 85 days.

This patent is subject to a terminal disclaimer.

(21) Appl. No.: 16/844,300

(22) Filed: Apr. 9, 2020

(65) Prior Publication Data

US 2020/0233893 A1    Jul. 23, 2020

Related U.S. Application Data

(63) Continuation of application No. 15/895,821, filed on Feb. 13, 2018, now Pat. No. 10,664,512.

(51) Int. Cl.
*G06F 16/435* (2019.01)
*G06Q 50/00* (2012.01)
(Continued)

(52) U.S. Cl.
CPC ...... *G06F 16/435* (2019.01); *G06F 16/24578* (2019.01); *G06F 16/951* (2019.01); *G06N 20/00* (2019.01); *G06Q 50/01* (2013.01)

(58) Field of Classification Search
None
See application file for complete search history.

(56) References Cited

U.S. PATENT DOCUMENTS 9,424,461 B1 * 8/2016 Yuan .................. G06K 9/00214
10,664,512 B1 * 5/2020 He .......................... G06N 20/00
(Continued)

OTHER PUBLICATIONS

"U.S. Appl. No. 15/895,821, Notice of Allowance dated Jan. 17, 2020", 9 pgs.

(Continued)

*Primary Examiner* — Wilson Lee
(74) *Attorney, Agent, or Firm* — Schwegman Lundberg & Woessner, P.A.

(57) ABSTRACT

Systems and methods are provided for generating training data from queries and user interactions associated with media collections related to the queries, and training a machine learning model using the generated training data to generate a trained machine learning model. The systems and methods further provide for receiving a prediction request comprising a query for relevant media collections, analyzing the query to determine query features, determining a plurality of media collections for the query, analyzing the plurality of media collections to determine media collection features for each media collection of the plurality of media collections, and generating, using the trained machine learning model, a semantic matching score for each media collection of the plurality of media collections based on matching the query features to the media collection features for each media collection of the plurality of media collections.

20 Claims, 10 Drawing Sheets

(51) Int. Cl.
*G06N 20/00* (2019.01)
*G06F 16/951* (2019.01)
*G06F 16/2457* (2019.01)

(56) References Cited

U.S. PATENT DOCUMENTS

| | | | | |
|---|---|---|---|---|
| 2014/0289323 | A1* | 9/2014 | Kutaragi | H04L 67/42 709/203 |
| 2016/0063093 | A1* | 3/2016 | Boucher | G06F 16/90324 707/748 |
| 2016/0112475 | A1* | 4/2016 | Lawson | H04L 67/2823 709/204 |
| 2016/0179967 | A1 | 6/2016 | Sa et al. | |
| 2016/0300252 | A1 | 10/2016 | Frank et al. | |
| 2017/0235848 | A1 | 8/2017 | Van Deusen et al. | |
| 2017/0270929 | A1 | 9/2017 | Aleksic et al. | |
| 2018/0011900 | A1* | 1/2018 | Husain | G06F 16/9535 |
| 2018/0039647 | A1* | 2/2018 | Winstanley | G06F 16/9535 |
| 2018/0083898 | A1* | 3/2018 | Pham | H04L 51/02 |
| 2018/0157884 | A1* | 6/2018 | Visentin | G06Q 50/01 |
| 2018/0203851 | A1* | 7/2018 | Wu | G06N 3/006 |
| 2018/0300757 | A1* | 10/2018 | Saxena | G06Q 30/0623 |
| 2019/0164082 | A1* | 5/2019 | Wu | G06Q 50/01 |
| 2019/0167107 | A1* | 6/2019 | Rohner | A61B 1/05 |
| 2019/0180327 | A1 | 6/2019 | Balagopalan et al. | |

OTHER PUBLICATIONS

Agichtein, Eugene, et al., "Learning User Interaction Models for Predicting Web Search Result Preferences", SIGIR '06, Seattle, Washington, USA, (Aug. 2006), 8 pgs.

Ai, Qingyao, et al., "Learning a Hierarchical Embedding Model for Personalized Product Search", SIGIR '17, Shinjuku, Tokyo, Japan, (2017), 10 pgs.

Donahue, Jeffrey, et al.. "Long-term recurrent convolutional networks for visual recognition and description", CVPR, IEEE, (2015), 2625-2634.

Dou, Zhicheng, et al., "Are Click-through Data Adequate for Learning Web Search Rankings?", CIKM '08, Napa Valley, California, USA, (Oct. 2008), 73-82.

Dupret, Georges, et al., "A User Browsing Model to Predict Search Engine Click Data from Past Observations", SIGIR '08, Singapore, ACM, (Jul. 2008), 331-338.

Fang, Hao, et al., "From captions to visual concepts and back", Microsoft Research—CVPR, 2015, (2015), 10 pgs.

He, Kaiming, et al., "Deep Residual Learning for Image Recognition", 2016 IEEE Conference on Computer Vision and Pattern Recognition, (2016), 770-778.

Huang, Po-Sen, et al., "Learning Deep Structured Semantic Models for Web Search Using Clickthrough Data", CIKM '13, San Francisco, CA, USA, (2013), 8 pgs.

Joachims, Thorsten, et al., "Accurately Interpreting Clickthrough Data as Implicit Feedback", SIGIR '05, Salvador, Brazil, (Aug. 2005), 8 pgs.

Joachims, Thorsten, et al., "Evaluating the Accuracy of Implicit Feedback from Clicks and Query Reformulations in Web Search", ACM TOIS 25, 2, 7, (Apr. 2007), 26 pgs.

Joachims, Thorsten, et al., "Unbiased Learning-to-Rank with Biased Feedback", WSDM 2017, Cambridge, United Kingdom, (Feb. 2017), 9 pgs.

Johnson, Justin, et al., "Densecap: Fully convolutional localization networks for dense captioning", CVPR, 2016, (Nov. 24, 2015), 10 pgs.

Kenter, Tom, et al., "Neural Networks for Information Retrieval", SIGIR '17, Shinjuku, Tokyo, Japan, (Aug. 2017), 4 pgs.

Kenter, Tom, et al., "Short Text Similarity with Word Embeddings", CIKM '15, Melbourne, Australia, (Oct. 2015), 10 pgs.

Kim, Youngho, et al., "Modeling Dwell Time to Predict Click-level Satisfaction", WSDM '14, New York, New York, USA, (Feb. 2014), 10 pgs.

Kingma, Diederik P, et al., "Adam: A Method for Stochastic Optimization", arXiv:1412.6980v9 [cs.LG], (Jan. 30, 2017), 15 pgs.

Lew, Michael S., et al., "Content-Based Multimedia Information Retrieval: State of the Art and Challenges", ACM Transactions on Multimedia Computing, Communications and Applications, vol. 2, No. 1, (Feb. 2006), 19 pgs.

Li, Hang, et al., "Semantic Matching in Search", Foundations and Trends in Information Retrieval, vol. 7, No. 5, (2013), 343-469.

Ma, Lin, et al., "Multimodal Convolutional Neural Networks for Matching Image and Sentence", ICCV, IEEE, (2015), 2623-2631.

Microsoft, DSSM, "Deep Structured Semantic Models—Microsoft Research", URL: https://www.microsoft.com/en-US/research/project/dssm/, (accessed May 10, 2018), 4 pgs.

Mikolov, Tomas, et al.,, "Distributed Representations of Words and Phrases and Their Compositionality", Advances in Neural Information Processing Systems, 2013, (2013), 9 pgs.

Mitra, Bhaskar, et al., "Learning to Match using Local and Distributed Representations of Text for Web Search", WWW 2017, Perth, Australia, (Apr. 2017), 9 pgs.

Radlinksi, Filip, et al., "Query Chains: Learning to Rank from Implicit Feedback", KDD '05, Chicago, Illinois, USA Proceedings of the eleventh ACM SIGKDD international conference on Knowledge discovery in data mining, (Aug. 2005), 10 pgs.

Shen, et al., "A Latent Semantic Model with Convolutional-Pooling Structure for Information Retrieval", In Proceedings of the 23rd ACM International Conference on Conference on Information and Knowledge Management, (Nov. 3, 2014), 10 pgs.

Srivastava, N., et al.,, "Dropout A Simple Way to Prevent Neural Networks from Overfitting", In Journal of Machine Learning Research, 15(1), (Jan. 2014), 1929-1958.

Van Gysel, Christophe, et al., "Learning latent Vector Spaces for Product Search", CIKM '16, Indianapolis, IN, USA, (Oct. 2016), 10 pgs.

Van Gysel, Christophe, et al., "Neural Vector Spaces for Unsupervised Information Retrieval", ACM TOIS, 1, 1, 1, (Jan. 2018), 25 pgs.

Vinyals, Oriol, et al., "Show and tell: A neural image caption generator", ICCV, 2015, (2015), 3156-3164.

Vulic, Ivan, et al., "Monolingual and Cross-Lingual Information Retrieval Models Based on (Bilingual) Word Embeddings", SIGIR '15, Santiago, Chile, (Aug. 2015), 10 pgs.

Xiong, Chenyan, et al., "End-to-End Neural Ad-hoc Ranking with Kernel Pooling", SIGIR '17, Shinjuku, Tokyo, Japan, (Aug. 2017), 10 pgs.

Xu, Kelvin, et al., "Show, attend and tell: Neural image caption generation with visual attention", NIPS, (Apr. 19, 2016), 22 pgs.

Zhai, Chengxiang, et al., "A Study of Smoothing Methods for Language Models Applied to information Retrieval", ACM Transactions on Information Systems, 22(2), (Apr. 2004), 179-214.

Zheng, Zhaohui, et al., "A Regression Framework for Learning Ranking Functions Using Relative Relevance Judgments", SIGIR '07, Amsterdam, The Netherlands, (Jul. 2007), 8 pgs.

* cited by examiner

QUERY MATCHING TO MEDIA COLLECTIONS IN A MESSAGING SYSTEM

CLAIM OF PRIORITY

This application is a continuation of U.S. patent application Ser. No. 15/895,821, filed on Feb. 13, 2018, which is incorporated herein by reference in its entirety.

BACKGROUND

A content sharing platform may receive millions of messages from users desiring to share media content such as audio, images, and video between user devices (e.g., mobile devices, personal computers, etc.). In some of these feature-rich multimodal social media platforms, images and videos may be first-class citizens, whereas text plays a supporting role. While this allows users to express themselves in new and exciting ways, this textual sparsity becomes problematic when developing a text-centric search functionality.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
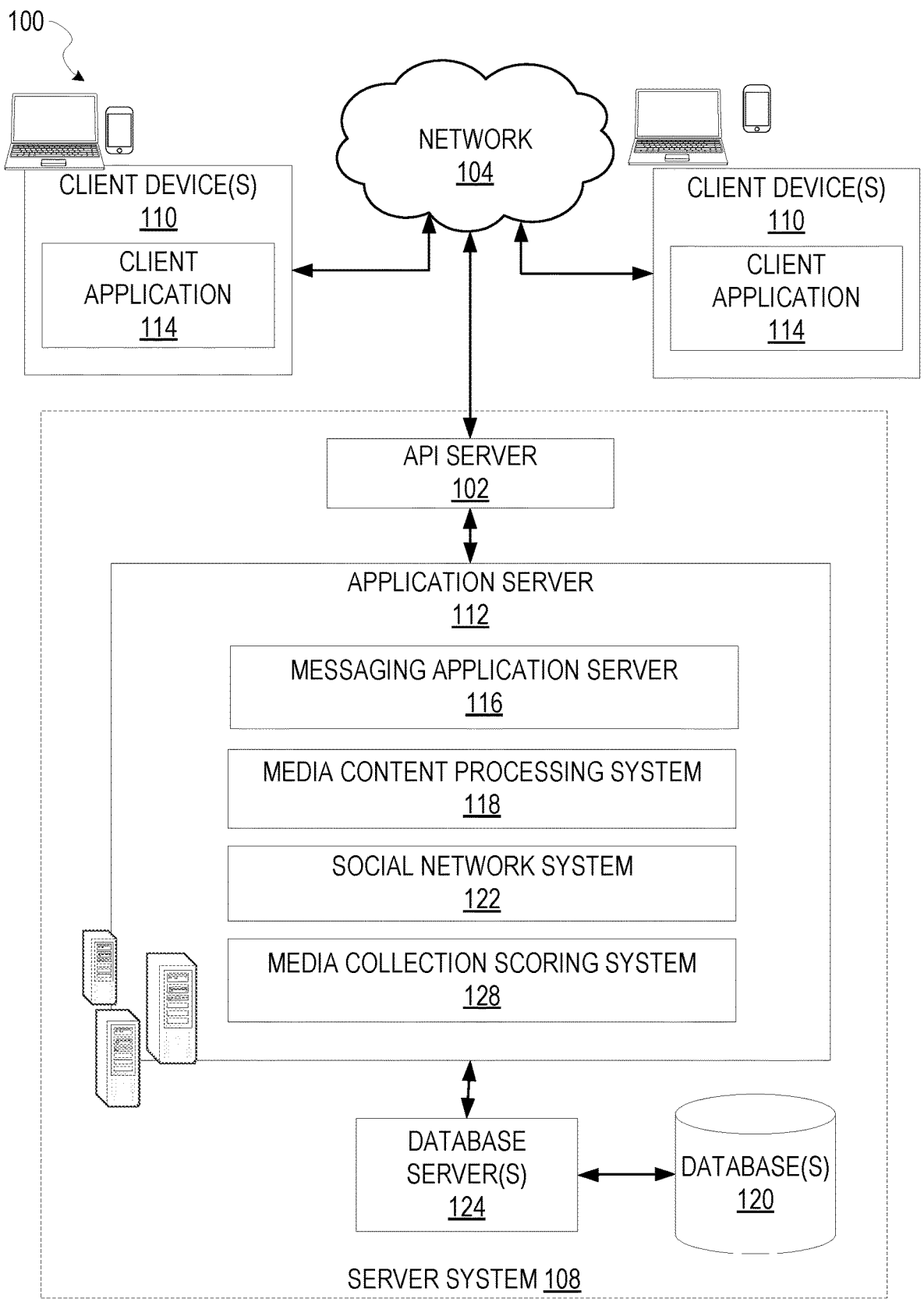
FIG. 1 is a block diagram showing an example messaging system for exchanging data (e.g., messages and associated content) over a network, according to some example embodiments.

Systems and methods described herein relate to machine learning modeling to match a signal between queries and visual features contained within media collections comprising media content items (e.g., images, videos, and/or audio). As indicated above, textual sparsity in content sharing platforms (e.g., social media platforms, messaging systems, etc.) becomes problematic when developing a text-centric search functionality within a social media platform. This is because text (e.g., captions included by a user with a media content item) is often short or undescriptive of the media content item (e.g., a still image or video) that it accompanies. A text search is typically implemented by means of measuring the overlap between query and document terms (e.g., literal string matching). When text is unavailable, short in length, or unrelated to the content it is supposed to represent, then search functionality based on textual overlap is ineffective.

Consequently, there is a vocabulary gap where textual queries and media collections not only use different words to describe the same concepts, but a query and a media collection are also expressed using different primary modalities. Systems and methods described herein address these types of technical problems by learning a matching signal between queries and the visual features contained within media collections (e.g., matching textual queries to visual media directly). Example embodiments comprise a methodology for extracting pairs of user queries and relevant media collections from historical search interaction logs and also a way of obtaining semantic representation of a user query and each media collection considered for ranking.

Example embodiments are described in the scenario of ranking media collections within a messaging platform. It is understood, however, that example embodiments may be used in other platforms or scenarios to match a signal between a query and visual media. In example embodiments, given a user-issued textual query q, we want to generate a ranking of media collections E that best satisfies the user's need for content. Media collections $e \in E$ can be of various types, such as location or topic, and consist of a collection of media-rich documents (e.g., media content items) $D(e) \subset D$ that are associated with media collection e. In one example, documents $d \in D$ are social network messages that have been shared publicly by the platform's users. Each document d contains visual media v (d) (e.g., a still image or a video) and has an optional textual caption t (d). More formally, for every media collection e and document d, we have an association strength $f: E \times D \rightarrow [0, \infty)$ that denotes the centrality of document d within media collection e. The set of documents associated with media collection e, $D(e) = \{d \in D | f(e,d) > 0\}$, then consists of all documents with a positive association score for media collection e. Note that, for most $d \in D$, f (e,d)=0 given a particular media collection e. In order to rank multimedia collections $e \in E$ according to the user's query q, a straightforward approach is to ignore the visual media and represent each media collection e as the concatenation of the captions of its associated documents D (e). As described above, however, message captions are often limited in length, as they are entered on a mobile or other computing device. In addition, in many cases captions do not sufficiently describe the visual media they accompany. Therefore, example embodiments learn a matching signal between the user's query and the visual media directly from implicit user feedback (e.g., clicks), as explained further below.

FIG. 1 is a block diagram illustrating a networked system 100 (e.g., a messaging system) for exchanging data (e.g., messages and associated content) over a network. The networked system 100 includes multiple client devices 110, each of which hosts a number of client applications 114. Each client application 114 is communicatively coupled to other instances of the client application 114 and a server system 108 via a network 104.

The client device 110 may comprise, but is not limited to, a mobile phone, desktop computer, laptop, portable digital assistant (PDA), smart phone, tablet, ultrabook, netbook, laptop, multi-processor system, microprocessor-based or programmable consumer electronic system, game console, set-top box, computer in a vehicle, wearable device, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth.

The client device 110 may be a device of a user that is used to create media content items such as video, images (e.g., photographs), and audio, and to send and receive messages containing such media content items, text, and so forth, to and from other users. The client device 110 may be a device of a user that is used to create and edit media overlays and create and access a plurality of media collections.

One or more users may be a person, a machine, or other means of interacting with the client device 110. In example embodiments, the user may not be part of the system 100, but may interact with the system 100 via the client device 110 or other means. For instance, the user may provide input (e.g., touch screen input or alphanumeric input) to the client device 110, and the input may be communicated to other entities in the system 100 (e.g., third party servers, server system 108, etc.) via the network 104. In this instance, the other entities in the system 100, in response to receiving the input from the user, may communicate information to the client device 110 via the network 104 to be presented to the user. In this way, the user may interact with the various entities in the system 100 using the client device 110.

The system 100 may further include the network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WI-FI network, a WiMax network, another type of network, or a combination of two or more such networks.

The client device 110 may access the various data and applications provided by other entities in the system 100 via a web client (e.g., a browser, such as the Internet Explorer® browser developed by Microsoft® Corporation of Redmond, Wash. State) or one or more client applications 114. The client device 110 may include one or more client applications 114 (also referred to as "apps") such as, but not limited to, a web browser, a messaging application, an electronic mail (email) application, an e-commerce site application, a mapping or location application, a media overlay application, an interactive messaging application, and the like.

In some embodiments, one or more client applications 114 may be included in a given one of the client devices 110, and configured to locally provide the user interface and at least some functionalities, with the client application 114 configured to communicate with other entities in the system 100 (e.g., third party servers, server system 108, etc.), on an as-needed basis, for data and/or processing capabilities not locally available (e.g., to process user queries, to authenticate a user, to verify a method of payment, etc.). Conversely, one or more client applications 114 may not be included in the client device 110, and then the client device 110 may use its web browser to access the one or more applications hosted on other entities in the system 100 (e.g., third party servers, server system 108, etc.).

In one example, a client application 114 may be a messaging application (e.g., messaging client application 114 as referred to below) that allows a user to take a photograph or video, add a caption to or otherwise edit the photograph or video, and then send the photograph or video to another user. In one example, the message may be ephemeral and be removed from a receiving user device after viewing or after a predetermined amount of time (e.g., 10 seconds, 24 hours, etc.). An ephemeral message refers to a message that is accessible for a time-limited duration. An ephemeral message may be a text, an image, a video, and other such content that may be stitched together in accordance with embodiments described herein. The access time for the ephemeral message may be set by the message sender. Alternatively, the access time may be a default setting or a setting specified by the recipient. Regardless of the setting technique, the message is transitory.

The messaging application may further allow a user to create a gallery or message collection (also referred to herein as a "media collection"). A gallery may be a collection of photos and videos which may be viewed by other users "following" the user's gallery (e.g., subscribed to view and receive updates in the user's gallery). In one example, the gallery may also be ephemeral (e.g., lasting 24 hours, lasting for a duration of an event (e.g., during a music concert, sporting event, etc.), or lasting another predetermined time).

An ephemeral message may be associated with a message duration parameter, the value of which determines an amount of time that the ephemeral message will be displayed to a receiving user of the ephemeral message by the client application 114. The ephemeral message may be further associated with a message receiver identifier and a message timer. The message timer may be responsible for determining the amount of time the ephemeral message is shown to a particular receiving user identified by the message receiver identifier. For example, the ephemeral message may only be shown to the relevant receiving user for a time period determined by the value of the message duration parameter.

In another example, the messaging application may allow a user to store photographs and videos and create a gallery that is not ephemeral and that can be sent to other users. For example, a user may assemble photographs and videos from a recent vacation to share with friends and family.

The server system 108 may provide server-side functionality via the network 104 (e.g., the Internet or a wide area network (WAN)) to one or more client devices 110 and/or one or more third party servers (not shown). The server system 108 may include an application programming interface (API) server 102, an application server 112, a messaging application server 116, a media content processing system 118, a social network system 122, and a media collection scoring system 128, which may be communicatively coupled with each other and with one or more data storage(s), such as database(s) 120.

The server system 108 may be a cloud-computing environment, according to some example embodiments. The server system 108, and any servers associated with the server system 108, may be associated with a cloud-based application, in one example embodiment.

The one or more database(s) 120 may be storage devices that store information such as untreated media content, original media content from users (e.g., high-quality media content), processed media content (e.g., media content that is formatted for sharing with client devices 110 and viewing on client devices 110), context data related to a media content item, context data related to a user device (e.g., computing or client device 110), media overlays, media overlay smart widgets or smart elements, user data, user device information, media content (e.g., video and images), media content data (e.g., data associated with video and images), computing device context data, serialized data, session data items, and so forth. The one or more databases 120 may further store information related to third party servers, third party applications, client devices 110, client applications 114, users, and so forth.

The one or more database(s) 120 may include cloud-based storage external to the server system 108 (e.g., hosted by one or more third-party entities external to the server system 108), While the storage devices are shown as database(s) 120, it is to be understood that the system 100 may access and store data in storage devices such as databases 120, blob storages, and other types of storage methods.

The system 100 may further include one or more third party servers (not shown). The one or more third party servers may include one or more third party application(s). The one or more third party application(s), executing on the third party server(s), may interact with the server system 108 via the API server 102 via a programmatic interface provided by the API server 102. For example, one or more of the third party applications may request and utilize information from the server system 108 via the API server 102 to support one or more features or functions on a website hosted by a third party or an application hosted by the third party. The third party website or application, for example, may provide functionality that is supported by relevant functionality and data in the server system 108.

Accordingly, each client application 114 is able to communicate and exchange data with other client applications 114 and with the server system 108 via the network 104. The data exchanged between client applications 114, and between a client application 114 and the server system 108, includes functions (e.g., commands to invoke functions) as well as payload data (e.g., text, audio, video, or other multimedia data).

The server system 108 provides server-side functionality via the network 104 to a particular client application 114. While certain functions of the system 100 are described herein as being performed by either a client application 114 or the server system 108, it will be appreciated that the location of certain functionality either within the client application 114 or within the server system 108 is a design choice. For example, it may be technically preferable to initially deploy, certain technology and functionality within the server system 108, but to later migrate this technology and functionality to the client application 114 where a client device 110 has a sufficient processing capacity.

The server system 108 supports various services and operations that are provided to the client application 114. Such operations include transmitting data to, receiving data from, and processing data generated by the client application 114. This data may include message content, client device information, geolocation information, media annotation and overlays, message content persistence conditions, social network information, live event information, date and time stamps, media content (e.g., video and images), media content data (e.g., data associated with video and images), and user data (e.g., user click data), as examples. Data exchanges within the networked system 100 are invoked and controlled through functions available via user interfaces (UIs) of the client application 114.

In the server system 108, the API server 102 is coupled to, and provides a programmatic interface to, the application server 112. The application server 112 is communicatively coupled to a database server 124, which facilitates access to the one or more database(s) 120 in which is stored data associated with messages processed by the application server 112.

The API server 102 receives and transmits message data (e.g., commands and message payloads) between the client device 110 and the application server 112. Specifically, the API server 102 provides a set of interfaces (e.g., routines and protocols) that can be called or queried by the client application 114 in order to invoke functionality of the application server 112. The API server 102 exposes various functions supported by the application server 112, including account registration; login functionality; the sending of messages, via the application server 112, from a particular client application 114 to another client application 114; the sending of media files (e.g., images or video) from a client application 114 to the messaging application server 116, for possible access by another client application 114; the setting of a collection of media data (e.g., a gallery, story, message collection, or media collection); the retrieval of such collections; the retrieval of a list of friends of a user of a client device 110; the retrieval of messages and content; the adding of friends to and deletion of friends from a social graph; the location of friends within a social graph; opening an application event (e.g., relating to the client application 114); and so forth.

The application server 112 hosts a number of applications and subsystems, including the messaging application server 116, the media content processing system 118, the social network system 122, and the media collection scoring system 128. The messaging application server 116 implements a number of message processing technologies and functions, particularly related to the aggregation and other processing of content (e.g., textual and multimedia content) included in messages received from multiple instances of the client application 114. The text and media content from multiple sources may be aggregated into collections of content (e.g., called stories, galleries, or media collections). These collections are then made available, by the messaging application server 116, to the client application 114. Other processor- and memory-intensive processing of data may also be performed server-side by the messaging application server 116, in view of the hardware requirements for such processing.

The application server 112 also includes the media content processing system 118, which is dedicated to performing various media content processing operations, typically with respect to images or video received within the payload of a message at the messaging application server 116. The media content processing system 118 may access one or more data storages (e.g., database(s) 120) to retrieve stored data to use in processing media content and to store results of processed media content.

The social network system 122 supports various social networking functions and services, and makes these functions and services available to the messaging application server 116. To this end, the social network system 122 maintains and accesses an entity graph 304 (depicted in FIG. 3) within the database 120. Examples of functions and services supported by the social network system 122 include the identification of other users of the networked system 100 with whom a particular user has relationships or whom the particular user is "following," and also the identification of other entities and interests of a particular user.

The messaging application server 116 may be responsible for generation and delivery of messages between users of client devices 110. The messaging application server 116 may utilize any one of a number of message delivery networks and platforms to deliver messages to users. For example, the messaging application server 116 may deliver messages using electronic mail (email), instant message (IM), Short Message Service (SMS), text, facsimile, or voice (e.g., Voice over IP (VoIP)) messages via wired networks (e.g., the Internet), plain old telephone service (POTS), or wireless networks (e.g., mobile, cellular, WIFI, Long Term Evolution (LTE), or Bluetooth).

Figure 2:
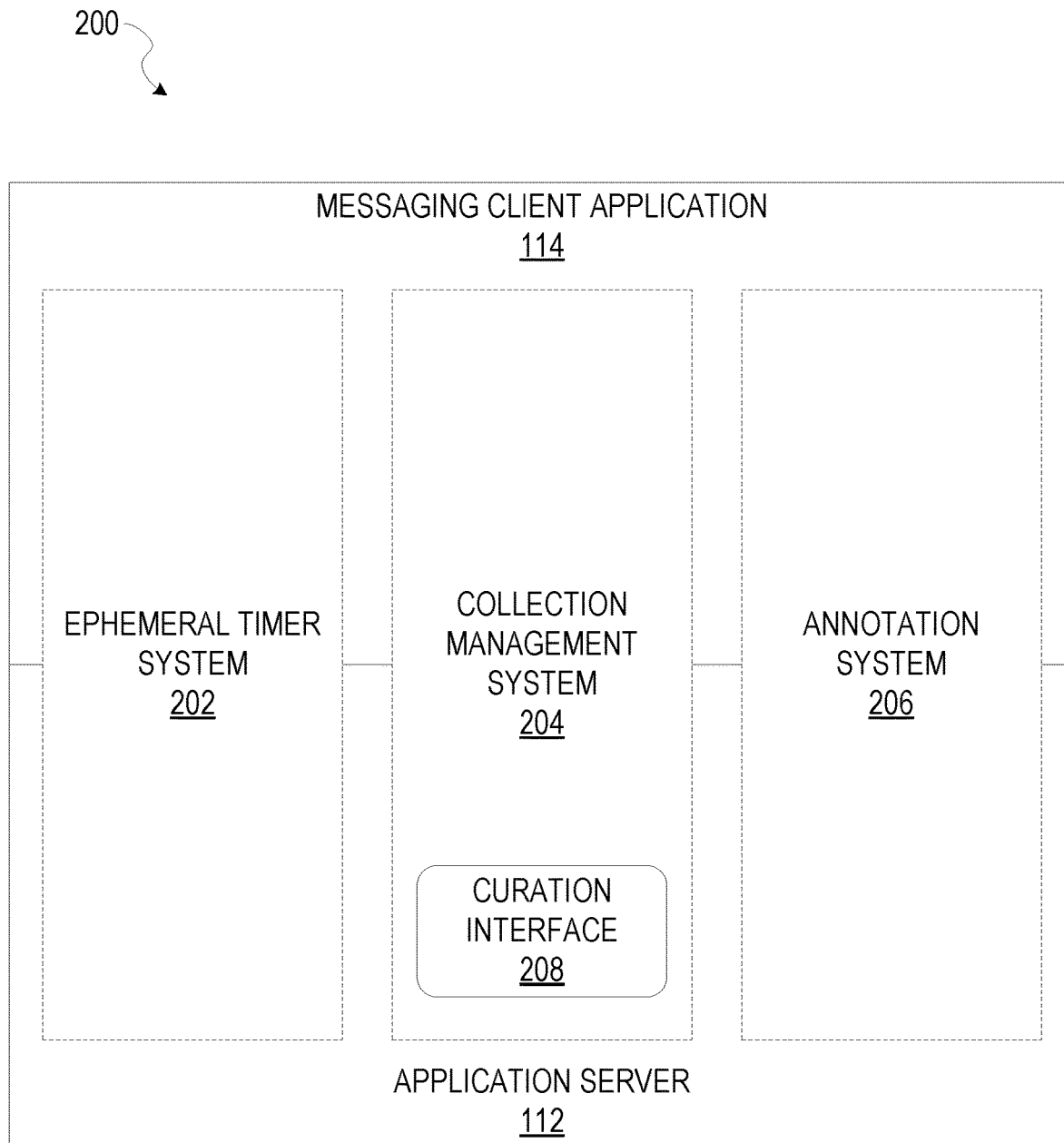
FIG. 2 is a block diagram illustrating further details regarding the messaging system, according to some example embodiments.

FIG. 2 is a block diagram 200 illustrating further details regarding the networked system 100, according to example embodiments. Specifically, the diagram 200 is shown to comprise a messaging client application 114 and the application server 112, which in turn embody a number of subsystems, namely an ephemeral timer system 202, a collection management system 204, and an annotation system 206.

The ephemeral timer system 202 is responsible for enforcing the temporary access to content permitted by the messaging client application 114 and the messaging application server 116. To this end, the ephemeral timer system 202 incorporates a number of timers that, based on duration and display parameters associated with a message, or collection of messages (e.g., otherwise referred to herein as media collections, galleries, message collections, stories, and the like), selectively display and enable access to messages and associated content via the messaging client application 114.

The collection management system 204 is responsible for managing collections of media (e.g., collections of text, image, video, and audio data), otherwise referred to herein as "media collections." In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "Story" for the duration of that music concert. The collection management system 204 may also be responsible for publishing an icon that provides notification of the existence of a particular collection to the user interface of the messaging client application 114.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation (e.g., money, non-money credits or points associated with the messaging system or a third party reward system, travel miles, access to artwork or specialized lenses, etc.) may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the networked system 100. In one example, the annotation system 206 operatively, supplies a media overlay (e.g., a filter or media augmentation) to the messaging client application 114 based on a geolocation of the client device 110, In another example, the annotation system 206 operatively supplies a media overlay to the messaging client application 114 based on other information, such as social network information of the user of the client device 110. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 110. For example, the media overlay includes text that can be overlaid on top of a photograph taken by the client device 110. In another example, the media overlay includes an identification of a location overlay (e.g., Venice Beach), a name of a live event, or a name of a merchant overlay (e.g., Beach Coffee House). In another example, the annotation system 206 uses the geolocation of the client device 110 to identify a media overlay that includes the name of a merchant at the geolocation of the client device 110. The media overlay may include other indicia associated with the merchant. The media overlays may be stored in the database 120 and accessed through the database server 124.

The annotation system 206 may further enable a user to interact with an interactive message, such as by adding one or more media content items to the interactive message, as described in further detail below. In one example embodiment, the annotation system 206 provides a publication platform that allows a user or merchant to create an interactive message with a plurality of objects associated with the interactive message for which users may add personal content. For example, a designer may create a video of a rock band with various interactive objects for different members of the hand (a drummer, a keyboard player, a guitarist, etc.). The video of the rock band may be made available to users as an interactive message.

In one example embodiment, the annotation system 206 provides a user-based publication platform that enables users to select a geolocation on a map, and upload content associated with the selected geolocation. The user may also specify circumstances under which a particular media overlay is to be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

Figure 3:
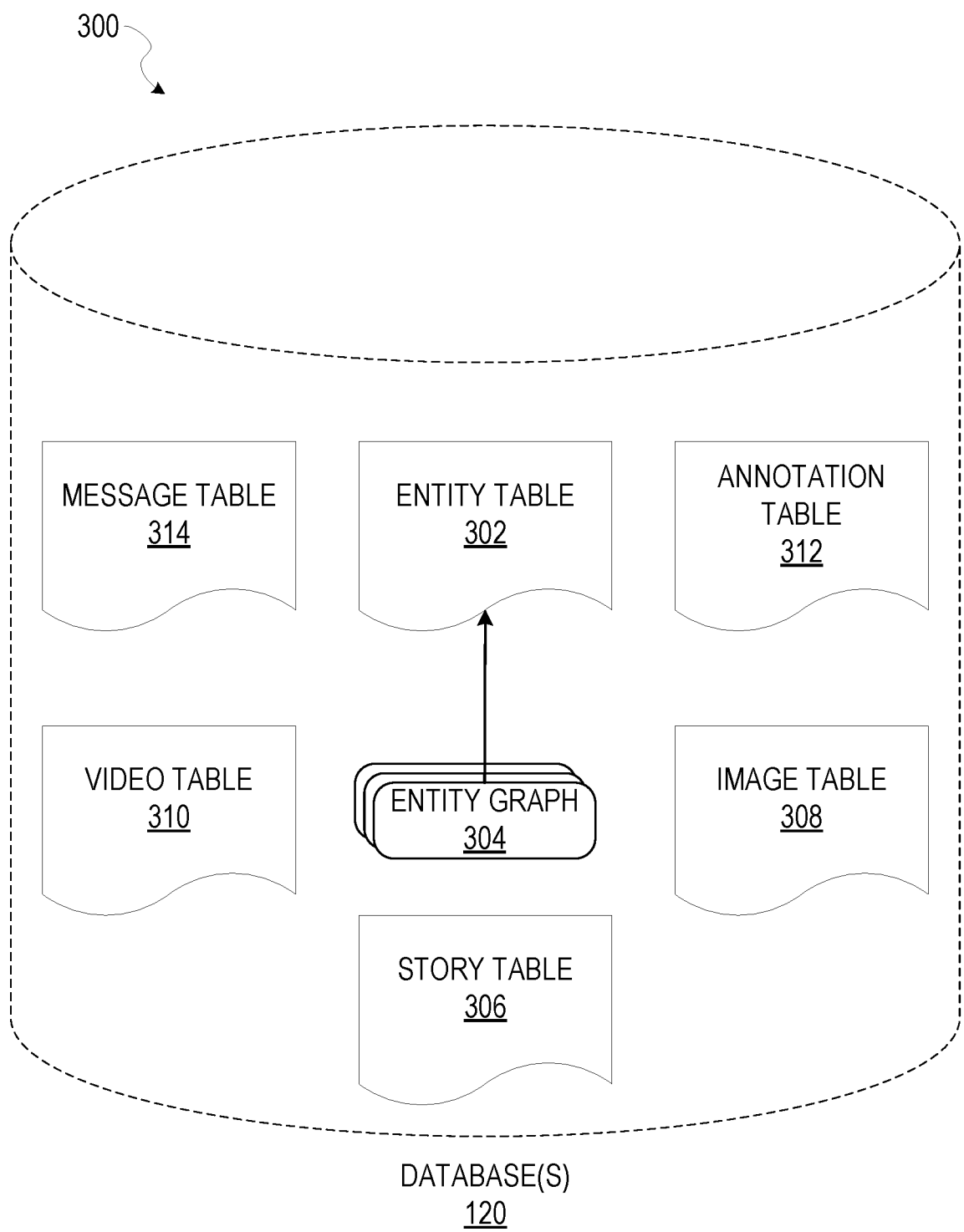
FIG. 3 is a schematic diagram illustrating data which may be stored in a database of a messaging server system, according to some example embodiments.

FIG. 3 is a schematic diagram 300 illustrating data which may be stored in the database(s) 120 of the server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, etc. Regardless of type, any entity regarding which the server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization), interested-based, or activity-based, merely for example.

The database 120 also stores annotation data, in the example form of media overlays or filters, in an annotation table 312. Annotation data may also be referred to herein as "creative tools" or "interactive features." Annotation data may comprise predefined interactive messages to be provided to users.

Media overlays or filters, for which data is stored within the annotation table 312, are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 114 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 114, based on geolocation information determined by a GPS unit of the client device 110. Another type of filter is a data filter, which may be selectively presented to a sending user by the messaging client application 114, based on other inputs or information gathered by the client device 110 during the message creation process. Examples of data filters include a current temperature at a specific location, a current speed at which a sending user is traveling, a battery life for a client device 110, or the current time.

Other annotation data that may be stored within the annotation table 312 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story, gallery, or media collection). The creation of a particular collection may be initiated by a particular user (e.g., any user for whom a record is maintained in the entity table 302). A user may create a "personal story" in the form of a collection of content that has been created and sent/broadcast by that user. To this end, the user interface of the messaging client application 114 may include an icon that is user-selectable to enable a sending user to add specific content to his or her personal story.

A media or message collection may also constitute a "live story," which is a collection of content from multiple users that is created manually, automatically, or using a combination of manual and automatic techniques. For example, a "live story" may constitute a curated stream of user-submitted content from various locations and events. Users whose client devices 110 have location services enabled and are at a common event location at a particular time may, for example, be presented with an option, via a user interface of the messaging client application 114, to contribute content to a particular live story. The live story may be identified to the user by the messaging client application 114, based on his or her location. The end result is a "live story" told from a community perspective.

A further type of content collection is known as a "location story," which enables a user whose client device 110 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
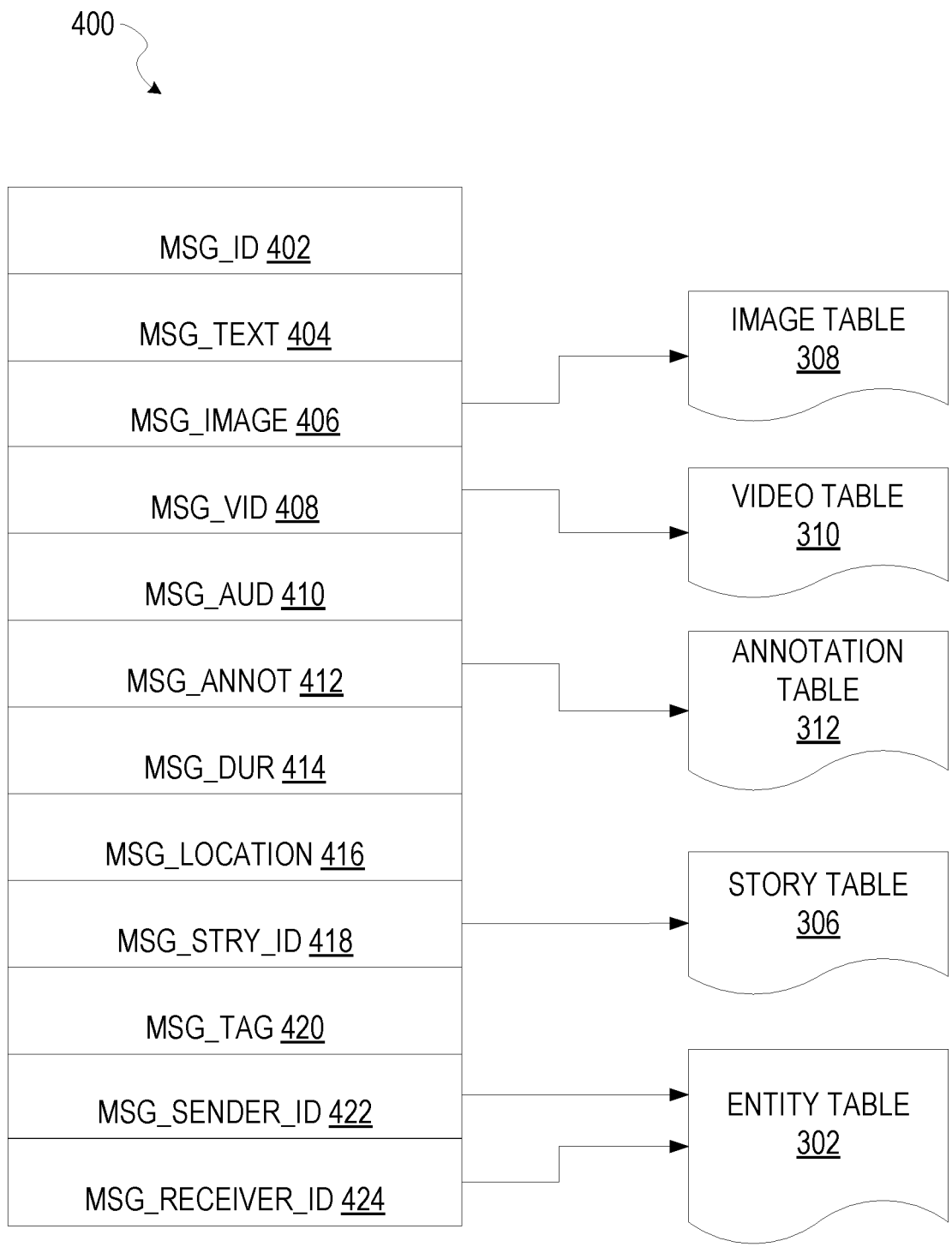
FIG. 4 is a schematic diagram illustrating a structure of a message, according to some embodiments, generated by a messaging client application for communication.

FIG. 4 is a schematic diagram illustrating a structure of a message 400, according to some embodiments, generated by a client application 114 for communication to a further client application 114 or the messaging application server 116. The content of a particular message 400 is used to populate the message table 314 stored within the database 120, accessible by the messaging application server 116. Similarly, the content of a message 400 is stored in memory as "in-transit" or "in-flight" data of the client device 110 or the application server 112. The message 400 is shown to include the following components:

- A message identifier 402: a unique identifier that identifies the message 400.
- A message text payload 404: text, to be generated by a user via a user interface of the client device 110 and that is included in the message 400.
- A message image payload 406: image data, captured by a camera component of a client device 110 or retrieved from memory of a client device 110, and that is included in the message 400.
- A message video payload 408: video data, captured by a camera component or retrieved from a memory component of the client device 110 and that is included in the message 400.
- A message audio payload 410: audio data, captured by a microphone or retrieved from the memory component of the client device 110, and that is included in the message 400.
- Message annotations 412: annotation data (e.g., media overlays such as filters, stickers, or other enhancements) that represents annotations to be applied to the message image payload 406, message video payload 408, or message audio payload 410 of the message 400.
- A message duration parameter 414: a parameter value indicating, in seconds, the amount of time for which content of the message 400 (e.g., the message image payload 406, message video payload 408, and message audio payload 410) is to be presented or made accessible to a user via the messaging client application 114.
- A message geolocation parameter 416: geolocation data (e.g., latitudinal and longitudinal coordinates) associated with the content payload of the message 400. Multiple message geolocation parameter 416 values may be included in the payload, each of these parameter values being associated with respective content items included in the content (e.g., a specific image within the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 110 on which the message 400 was generated and from which the message 400 was sent.

A message receiver identifier 424: an identifier (e.g., a messaging system identifier, email address, or device identifier) indicative of a user of the client device 110 to whom the message 400 is addressed.

The contents (e.g., values) of the various components of the message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
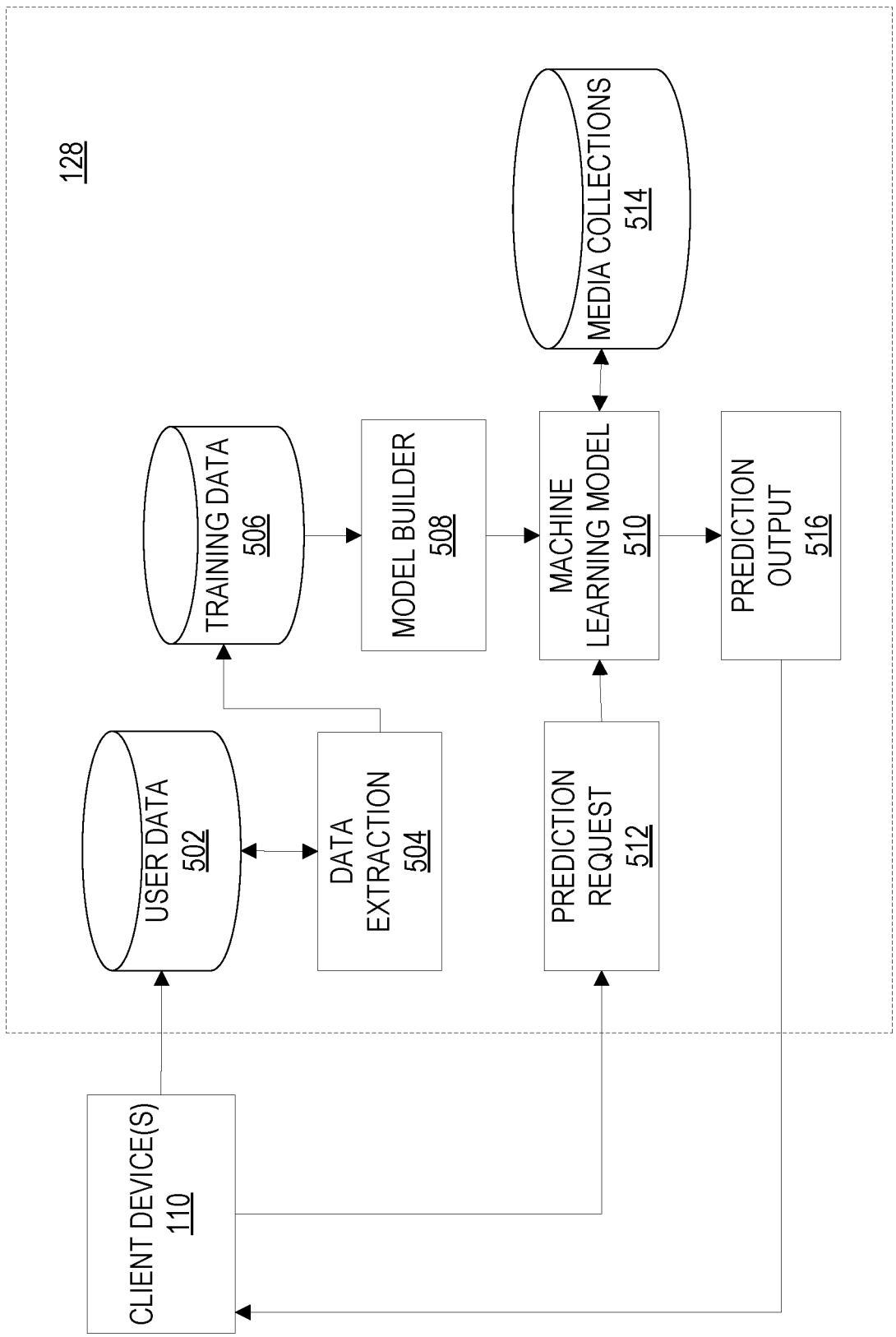
FIG. 5 is a block diagram illustrating a machine learning modeling and media collection scoring system, according to some example embodiments.

FIG. 5 is a block diagram illustrating the media collection scoring system 128. Client device(s) 110 may provide to the media collection scoring system 128 a plurality of data related to users and user interactions (e.g., clicks, impressions, views, etc.) with content such as one or more media collections. This data is received by the media collection scoring system 128 and collected and stored as user data 502 (e.g., in one or more databases). A data extraction module 504 extracts data from the user data 502 and stores the data as training data 506 (e.g., in one or more databases). For example, the data extraction module 504 may extract positive examples and negative examples from the user data 502 to use as training data 506, as described in further detail below.

The training data 506 is used by a model builder 508 to learn a machine learning model 510. A prediction request module 512 receives requests for a prediction (e.g., user queries for media collections) from the client device(s) 110 and inputs the requests into the machine learning model 510. The machine learning model 510 takes the query input and a plurality of media collections 514 stored in one or more databases to generate a prediction. The prediction may comprise a score for each media collection of the plurality of media collections to be used to rank the plurality of media collections. A prediction output module 516 may take the prediction output by the machine learning model 510 and return the scores or ranking to the client device(s) 110. For example, the prediction output module 516 may simply return the score for each of a plurality of media collections, and then the client device 110 (e.g., via a messaging or other client application 114) may rank the media collections using the scores and display them to a user. In another example, the prediction output module 516 may provide the ranking to the client device 110, and the client device may display the media collections according to the ranking. In yet another example, the prediction output module 516 may select a predetermined number of media collections based on the score for each media collection, and only return the top-scored media collections to the client device 110. These and other variations of use of the prediction results may be employed in various use cases.

Any one or more of the modules described herein may be implemented using one or more processors (e.g., by configuring such one or more processors to perform functions described for that module) and hence may include one or more of the processors. Any one or more of the modules described may be implemented using hardware alone (e.g., one or more of the processors of a machine) or a combination of hardware and software. For example, any module described of the media collection scoring system 128 may physically include an arrangement of one or more of the processors (e.g., a subset of or among the one or more processors of the machine) configured to perform the operations described herein for that module. As another example, any module of the media collection scoring system 128 may include software, hardware, or both, that configure an arrangement of one or more processors (e.g., among the one or more processors of the machine) to perform the operations described herein for that module. Accordingly, different modules of the media collection scoring system 128 may include and configure different arrangements of such processors or a single arrangement of such processors at different points in time. Moreover, any two or more modules of the media collection scoring system 128 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 6:
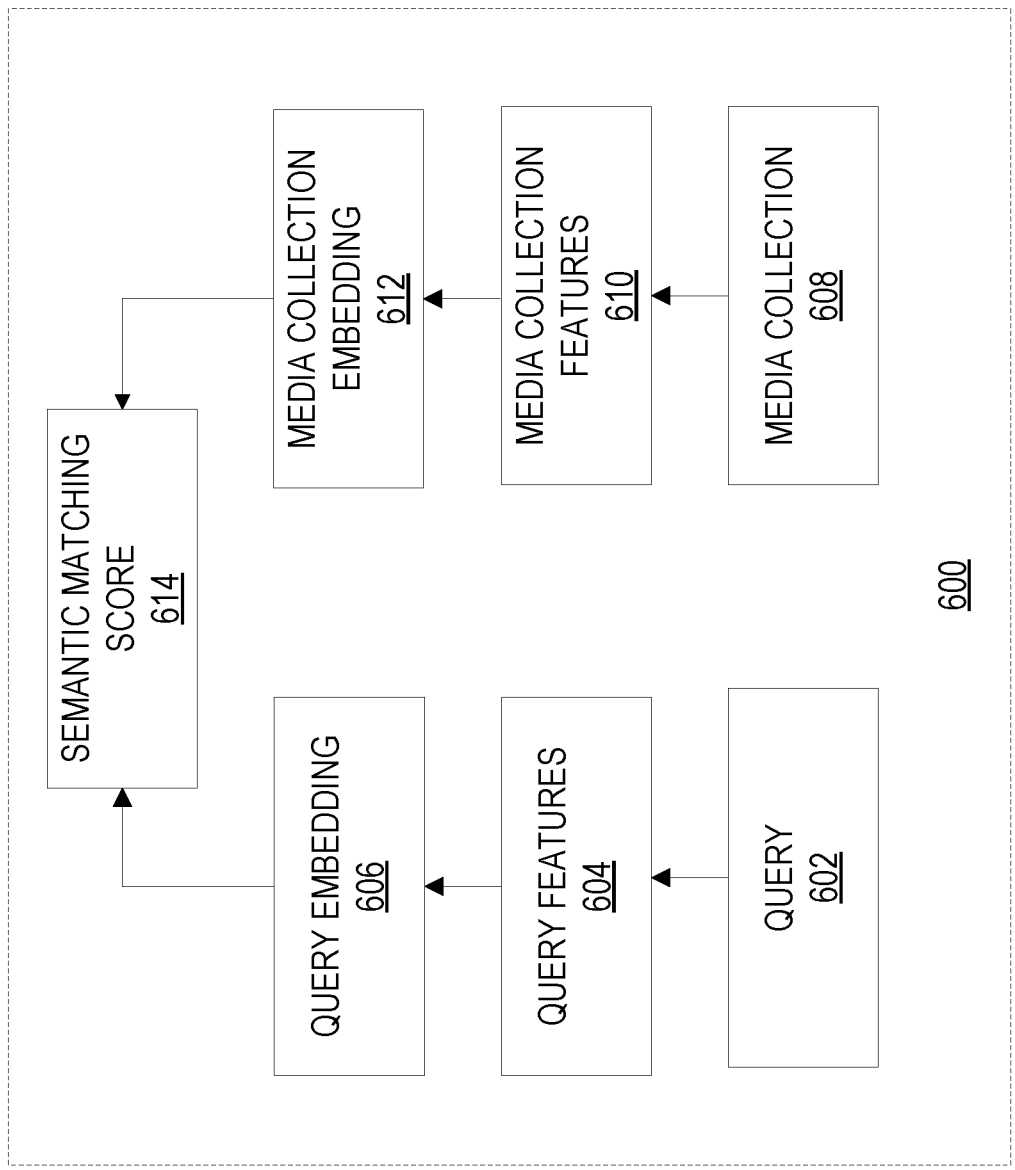
FIG. 6 is a block diagram illustrating inputs to a machine learning model and scoring by the machine learning model, according to some example embodiments.

FIG. 6 is a block diagram 600 illustrating inputs to the machine learning model 510 and scoring by the machine learning model 510. In FIG. 6, a query 602 and a media collection 608 (e.g., each media collection 608 of a plurality, of media collections) may each be analyzed to generate query features 604 and media collection features 610, as further described below.

The query embedding 606 maps words and phrases into a vector representation using hashing or word embedding techniques. The query embedding 606 ensures that the embedding of words with similar semantics are mapped to similar position in the vector embedding space. The media collection embedding 612 is similar which maps media collection into vector representation using techniques like convolutional neural network or feed-forward neural networks to preserve semantic similarity. Based on the embedding extracted from both query embedding 606 and media collection embedding 612, the semantic matching score 614 is generated from a machine learning model based on deep neural networks to measure the relevance between the two.

Figure 7:
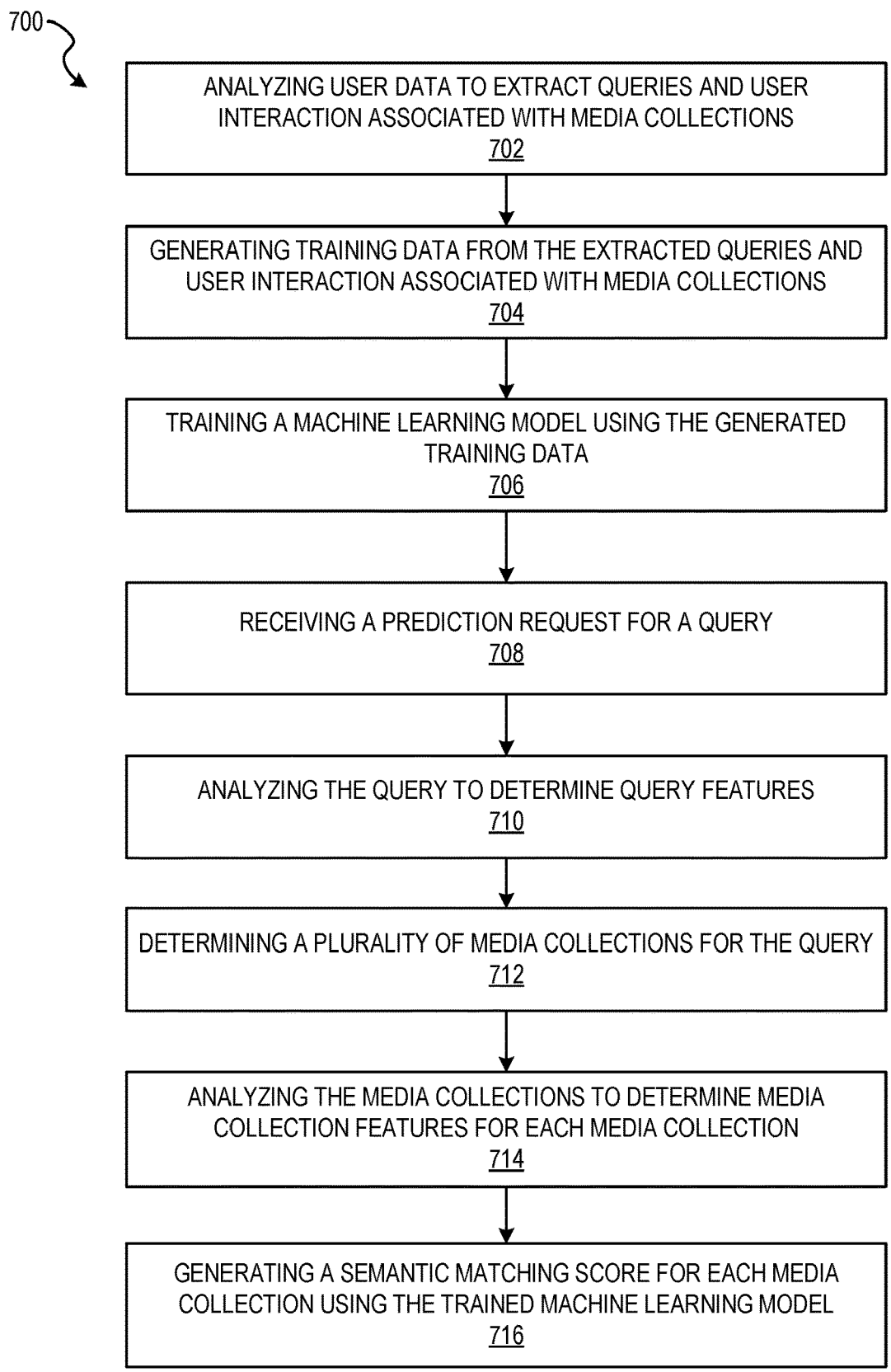
FIG. 7 is a flow chart illustrating aspects of a method, according to some example embodiments.

FIG. 7 is a flow chart illustrating aspects of a method 700 for generating training data, training a machine learning model, and generating a semantic matching score for a media collection, according to some example embodiments. For illustrative purposes, the method 700 is described with respect to the networked system 100 of FIG. 1 and media collection scoring system 128 of FIG. 5. It is to be understood that the method 700 may be practiced with other system configurations in other embodiments.

In operation 702, a computing system (e.g., server system 108, media collection scoring system 128, etc.) analyzes user data (e.g., user data 502) generated by a plurality of computing devices associated with a plurality of users in a messaging system, or other social network platform, to extract queries and user interactions associated with media collections related to the queries from the user data. The user data may be for a predetermined period of time (e.g., one week, three weeks, one month, fifty-five days, etc.). The user data may be generated by storing user queries and associated media collections in one or more databases.

In one example, the user data may be search engine interaction logs for the messaging system. Implicit user preferences are extracted by mining the search engine interaction logs of the messaging system. For example, when a user of the messaging system inputs a query to search for media collections, the user is presented with a list of media collections. In one example, each media collection is represented in the list by a thumbnail of a media content item in the media collection with a highest association score, $argmaxd \in D(e) f(e,d)$, in addition to a short key phrase (e.g., location name, event name, subject name, etc.) that describes the media collection. When the user selects (e.g., clicks, presses on a touch screen, etc.) a media collection in the list of media collections, the user is presented with a graphical user interface (GUI) where the user may browse through individual media content items contained within the media collection. In one example, a media collection may comprise hundreds of media content items.

In one example, the user data is filtered to filter out infrequent queries for privacy reasons. For example, a search string (e.g., of a query) may need to occur a certain number of times (e.g., four) in a certain amount of time (e.g., three months) before it can be used for analysis purposes.

From the extracted queries and user interactions associated with media collections related to the queries, the computing system generates training data, as shown in operation 704. The training data may comprise positive examples and negative examples.

Positive examples for training data are generated based on determining whether a user has consumed a media collection in a list of media collections associated with a query (e.g., a list of media collections returned in response to a query). When the user is presented with the list of media collections (e.g., search engine result page), the user judges the potential relevance of a ranked item by examining the available information (e.g., thumbnail and/or short key phrase) of that media collection within the list of media collections. After a media collection is determined attractive, the user may select the media collection to determine its actual relevance. Under the assumption that the user already determined the potential relevance of the selected media collection, click information (e.g., selection information) is often used as an implicit feedback signal to train and evaluate search engines. In the scenario where there is only limited information visible to the user (e.g., thumbnail and key phrase), it is difficult for the user to judge a media collection's potential relevance only from the information present within the list of media collections. Instead, it is likely that the user will click (e.g., select) a media collection to examine a few media content items, before determining whether the media collection is potentially relevant or not. Consequently, we do not consider a click to be positive feedback (e.g., to be used as a positive training example), but instead only record a positive feedback signal, in one example, when the user examines at least three media content items of a media collection (e.g., three media posts in a multimedia story). This use of user interactions within the clicked multimedia story is related to the use of dwell time within a web search to determine user satisfaction. One difference, however, is that within a web search, the user is presented with more detailed information about a document before clicking. Consequently, dwell time within a web search is a stronger implicit feedback signal than what is considered for example embodiments described herein.

Thus, the computing system determines that a user has "consumed" a media collection for purposes of a positive feedback signal, if the user performs a certain number of interactions within the media collection after selecting or opening the media collection. In one example, at least three interactions within the media collection will determine that a media collection has been consumed by a user. In one example, an interaction may comprise advancing to the next media content item within the media collection, opening a sub-media collection within the media collection, or navigating to a previous media content item in the media collection. In one example, navigating to a previous media content item in the media collection may be counted as double because it indicates that the user intends to re-consume the content. In one example, a user may consume a media collection by viewing at least three media content items in the media collection.

In one example, a media collection may be included as a positive example only if it is the only media collection that is selected in the list of media collections. For example, if a user selects or views two different media collections in a list of media collections, it may be an ambiguous signal and thus may not be used as a positive example for training data. Thus, a positive example may comprise a query and the only media collection in the associated list of media collections that was determined to have been consumed by the user. An example of a positive example may be that a user selects and consumes only one media collection in a list of media collections provided to the user in response to a query for the New York Times. The positive example would comprise the query for the New York Times and the only one media collection that was consumed by the user.

The computing system thus generates positive examples (e.g., positive feedback) for training data using queries and associated media collections that have been consumed by a user, and the computing system may generate negative examples for training data by randomly sampling queries and associated media collections from the user data. In one example, kneg=20 random media collections are considered as negative examples for every positive feedback instance.

In operation 706, the computing system trains a machine learning model (e.g., via the model builder 508) using the generated training data (e.g., training data 506) to generate a trained machine learning model (e.g., machine learning model 510). The machine learning model may also be referred to herein as a semantic matching model.

For example, given the extracted queries and their potential relevant media collections, a matching model is built between the two modalities (e.g., text and image). A user query is represented as a bag of its words, and every word has an associated semantic low-dimensional vector representation. Media collections are represented by an aggregated representation of the visual concepts they contain. Visual concepts are extracted from individual still images (e.g., for videos, a thumbnail is used as its image) using an object recognition model. Media collections are then represented by an aggregated vector of the concept counts contained within their constituent media content items. Queries and media collections are projected within a low-dimensional semantic vector space, and matching is performed between the two modalities by measuring the similarity of the query/media collection vectors within the semantic space. The semantic matching score can then be used as a ranking signal within a messaging system (or other system) search engine.

Figure 8:
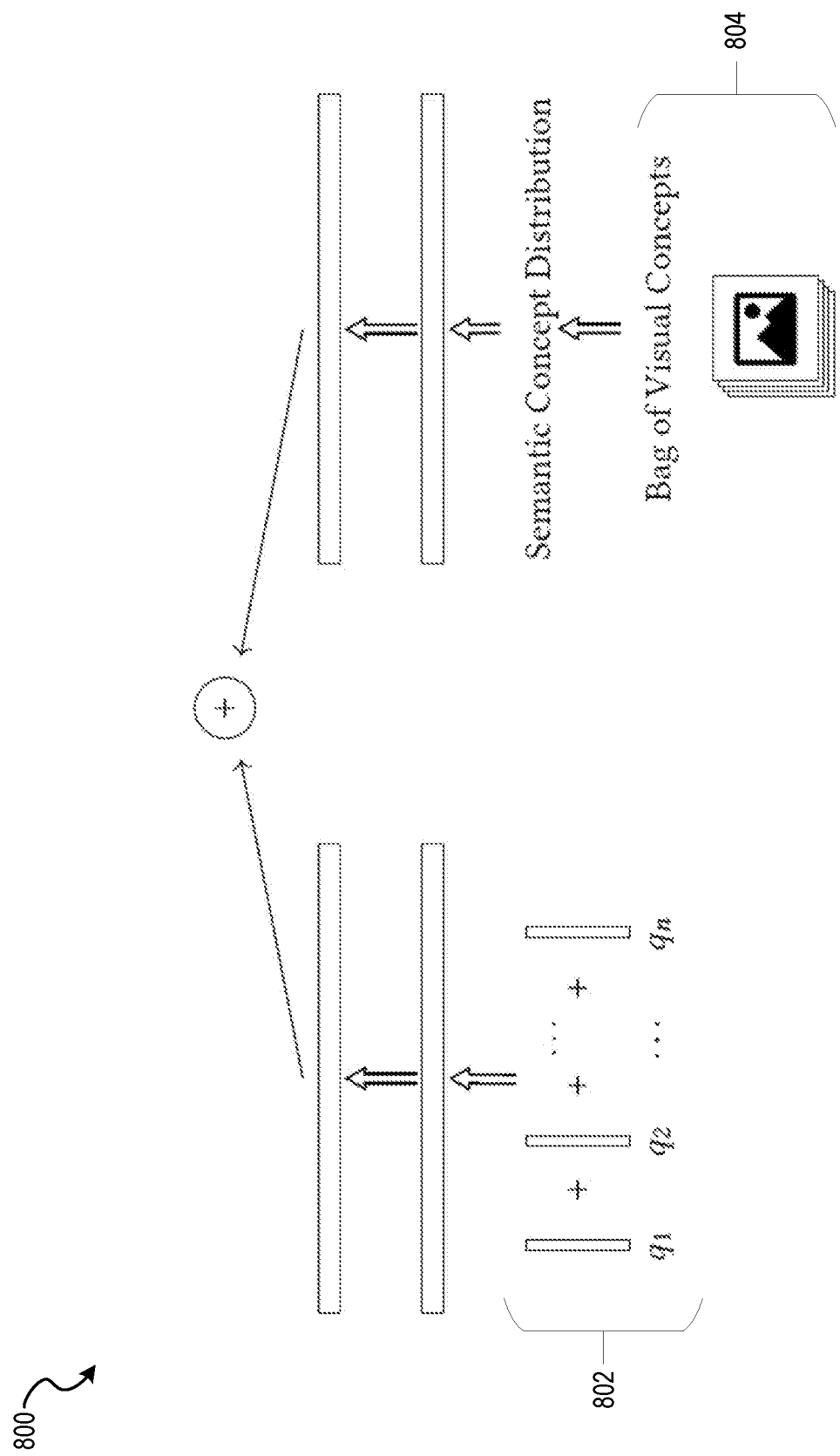
FIG. 8 is a diagram illustrating an overview of a semantic matching model, according to some example embodiments.

FIG. 8 shows an example overview of a semantic matching model 800 that learns to match textual queries 802 and the visual media contained within media collections 804. Queries are represented by aggregating the latent word representations of their terms, and media collections by aggregating the predictions of a pre-trained deep convolutional neural network. Both modalities—the query and the media collection—are then projected into a semantic space where the dot product is used to obtain a similarity score.

For example, individual query terms are represented by a low-dimensional word vector that is learned as part of the model. The representations of individual query terms are then aggregated into a query representation by averaging the representation of the query's terms. Afterwards, the query representation is projected into the semantic matching space through a series of transformations and nonlinearities. A media collection is represented by a dimensionality-reduced visual bag-of-concepts vector that is obtained by classifying the individual still images using a pre-trained deep convolutional neural network (CNN) into a probability distribution over a fixed number of visual concepts. The distribution over visual concepts of every image is then transformed into a binary vector by thresholding. The binary vectors of the constituent images of the media collection are then summed and subsequently normalized (I2-norm) to obtain a concept vector for the media collection. In one example, an aggregated representation for the media collection is used, and not the image features that are extracted from the pre-trained CNN, because individual images do not necessarily contain elements that can be matched to the query. This is due to the fact that some media collections are created by grouping social networking posts that were posted within the same region, whereas other media collections are created due to word overlap in the textual captions that accompany the visual media posts. More specifically, for a particular document (e.g., media content item) d∈D and its associated visual media v (d), denote P (c|v (d)) as the probability of document d containing visual concept c∈C from a lexicon of visual concepts C. The term frequency tf of visual concept c within document d then equals:

$$tf(d, c) = \begin{cases} 1 & \text{if } P(c \mid v(d)) \geq t \\ 0 & \text{otherwise} \end{cases}.$$

The term frequency of visual concept c within a media collection e equals the sum of the term frequencies of its constituent documents, tf (e, c)=Σd∈D(e) tf (d, c) ∀c∈C. Similar to document frequency for terms (e.g., the number of documents a term occurs in), we can define the number of media collections e∈E with tf (e, c)>0 as the media collection frequency of visual concept c. The bag of visual concepts vector is then given by r=BoC (e) for media collection e where rc=tf (e, c) idf (c) denotes the TF-IDF for visual concept c within media collection e, where idf (c) is the inverse media collection frequency of visual concept c.

Given that there are many visual concepts that can be detected within an image (e.g., more than 4000 in our experiments), we first reduce the dimensionality by training a Latent Dirichlet Model (LDA) topic model. This allows us to group visual concepts into a single semantic concept that can be used for matching.

Once the machine learning model has been trained, it can be used to generate predictions or scores for media collections to be used in ranking media collections in response to a query. In operation 708 of FIG. 7, the computing system may receive a prediction request from a computing device (e.g., client device 110). The prediction request may comprise a query for relevant media collections. The prediction request may also comprise a list of media collections to be used as candidates for prediction. The prediction request may further comprise information associated with the computing device (e.g., device location, device identifier, device type, etc.), a user associated with the computing device (e.g., user preferences, etc.), and so forth.

For example, a user may enter a search for "fire in Burbank" to find media collections related to a fire in Burbank. In another example, a user may enter a search for "camping gear" to find media collections related to camping gear for an upcoming camping trip, or search for media collections related to a particular event, such as a concert or sporting event. After the user enters the query terms, the computing device sends the query terms in a prediction request to the computing system to request a ranking for media collections to present to the user in response to the query terms entered.

In operation 710, the computing system analyzes the query to determine query features. For example, the computing system determines the individual query terms (e.g., words and phrases) to be used to match to each media collection in a plurality of media collections. In one example, all query terms are used to match to each media collection in the plurality of media collections. The computing system may also determine other features associated with the query, such as a location of the query (e.g., a location of a computing device that sent the query), among other things In operation 712, the computing system determines a plurality of media collections for the query. As explained above, a list of media collections (e.g., a list of identifiers associated with media collections) may be included in the prediction request from the computing device. For example, the computing device may already have access to a predetermined number of media collections for which it is requesting a ranking. In another example, the computing system may determine a plurality of media collections that may be relevant to the query. In one example, this may be all the available media collections (e.g., all the available media collections may be scored for ranking). In another example, this may be a subset of all the available media collections. In yet another example, a candidate set of media collections may be retrieved based on a partial, fuzzy match of the query and the title of the media collection. For example, if the user searches for "Venice Beach," the candidates may include "Santa Monica Beach" since it includes the word "beach."

In operation 714, the computing system analyzes the media collections to determine media collection features for each media collection of the plurality of media collections. As explained above, the computing system may use an object recognition model (e.g., a pre-trained deep convolutional neural network) to determine a number of visual concepts of media content items within each media collection. The visual concepts may be used as input to a machine learning model for relevance scoring. The visual concepts may be the features of the media collection, in one example. In another example, the features may also comprise location features (e.g., location associated with the media collection, location associated with individual media content items within the media collection, location of an event associated with the media collection, etc.), caption features (e.g., text associated with individual media content items or the media collection), and so forth.

In operation 716, the computing system generates a semantic matching score for each media collection of the plurality of media collections using the trained machine learning model. For example, the computing system inputs the query features (e.g., text of terms in the query) and the media collection features (e.g., visual concepts), and the machine learning model predicts a score for each of the media collections of the plurality of media collections.

In one example, a separate media collection score may be determined based on a popularity of the media collection, a quality of the media collection, or other data. This media collection score may be added to the semantic matching score to provide a total ranking score for the media collection.

In another example, a separate explicit score may be determined based on measuring a distance between a user associated with the query (e.g., a user location or device location of the user) and the media collection (e.g., a location associated with the media collection). For example, the system may determine that the user is in a particular geographic location, in a particular type of location (e.g., home, work, restaurant, bar, etc.), in a popular location (e.g., Times Square in New York, the Golden Gate Bridge in San Francisco), and so forth. This explicit score may be added to the semantic matching score to provide a total ranking score for the media collection. In another example, both the media collection score and the explicit score may be added to the semantic matching score to provide a total ranking score for the media collection.

The computing system may then return the score for each media collection, or a ranking based on the scores, to the computing device, and the computing device may use the scores or ranking to rank the plurality of media collections and display the plurality of media collection in ranking order.

Figure 9:
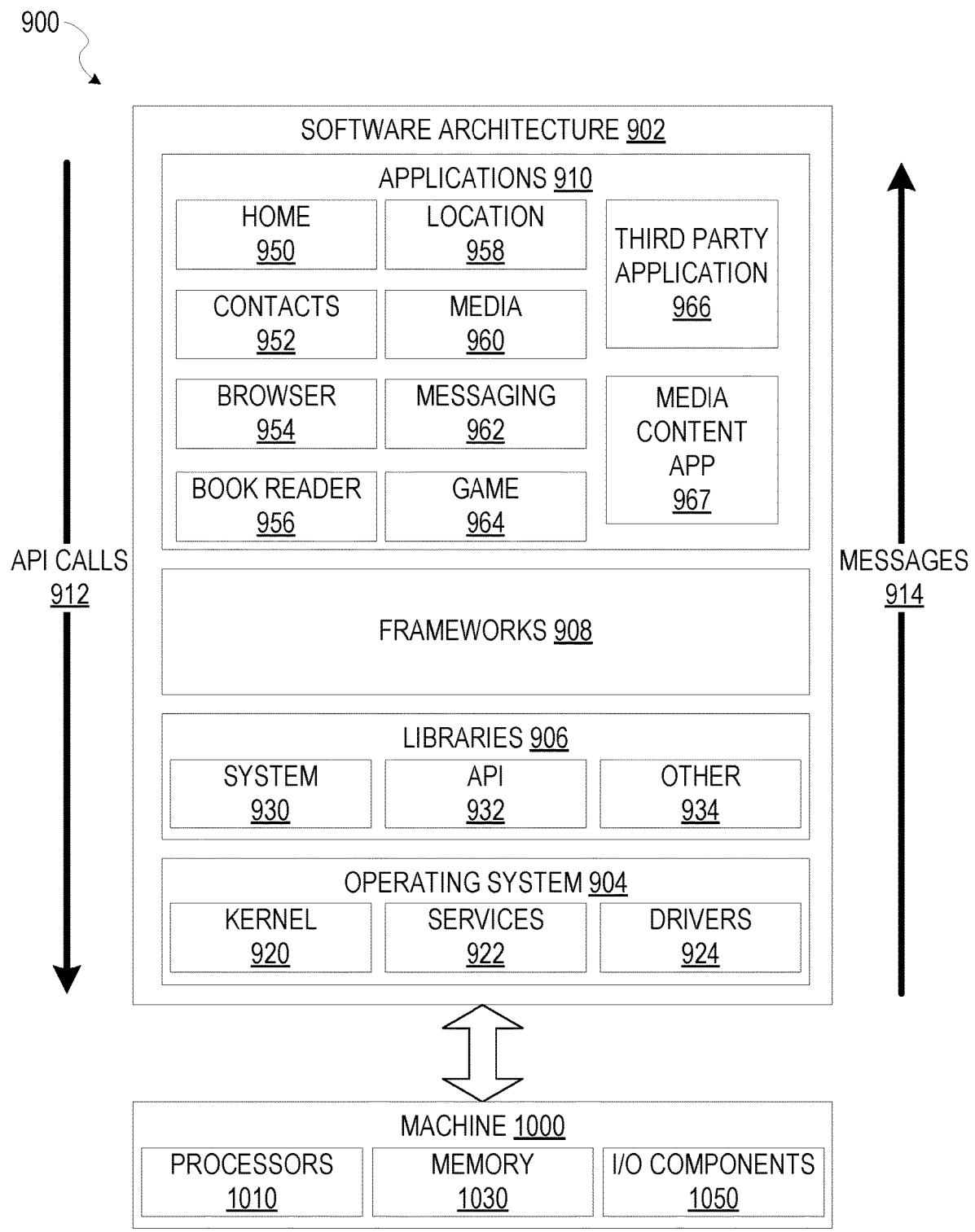
FIG. 9 is a block diagram illustrating an example of a software architecture that may be installed on a machine, according to some example embodiments.

FIG. 9 is a block diagram 900 illustrating a software architecture 902, which can be installed on any one or more of the devices described above. For example, in various embodiments, client devices 110, server systems 108, and servers 102, 112, 116, 118, 122, 124 and 128 may be implemented using some or all of the elements of the software architecture 902. FIG. 9 is merely a non-limiting example of a software architecture, and it will be appreciated that many other architectures can be implemented to facilitate the functionality described herein. In various embodiments, the software architecture 902 is implemented by hardware such as machine 1000 of FIG. 10 that includes processors 1010, memory 1030, and I/O components 1050. In this example, the software architecture 902 can be conceptualized as a stack of layers where each layer may provide a particular functionality. For example, the software architecture 902 includes layers such as an operating system 904, libraries 906, frameworks 908, and applications 910. Operationally, the applications 910 invoke API calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers, consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL, framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface (GUI) functions, high-level resource management, high-level location services, and so forth. The frameworks 908 can provide a broad spectrum of other APIs that can be utilized by the applications 910, some of which may be specific to a particular operating system 904 or platform.

In an example embodiment, the applications 910 include a home application 950, a contacts application 952, a browser application 954, a book reader application 956, a location application 958, a media application 960, a messaging application 962, a game application 964, and a broad assortment of other applications such as a third party application 966. According to some embodiments, the applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third party application 966 can invoke the API calls 912 provided by the operating system 904 to facilitate functionality described herein.

Some embodiments may particularly include a media content application 967. In certain embodiments, this may be a standalone application that operates to manage communications with a server system such as third party servers or the server system 108. In other embodiments, this functionality may be integrated with another application (e.g., messaging application 962). The media content application 967 may request and display various data related to messaging, media content, media collections, media overlays, and so forth, and may provide the capability for a user to input data related to the system via a touch interface, via a keyboard, or using a camera device of the machine 1000, communication with a server system via I/O components 1050, and receipt and storage of object data in memory 1030. Presentation of information and user inputs associated with the information may be managed by the media content application 967 using different frameworks 908, library 906 elements, or operating system 904 elements operating on the machine 1000.

Figure 10:
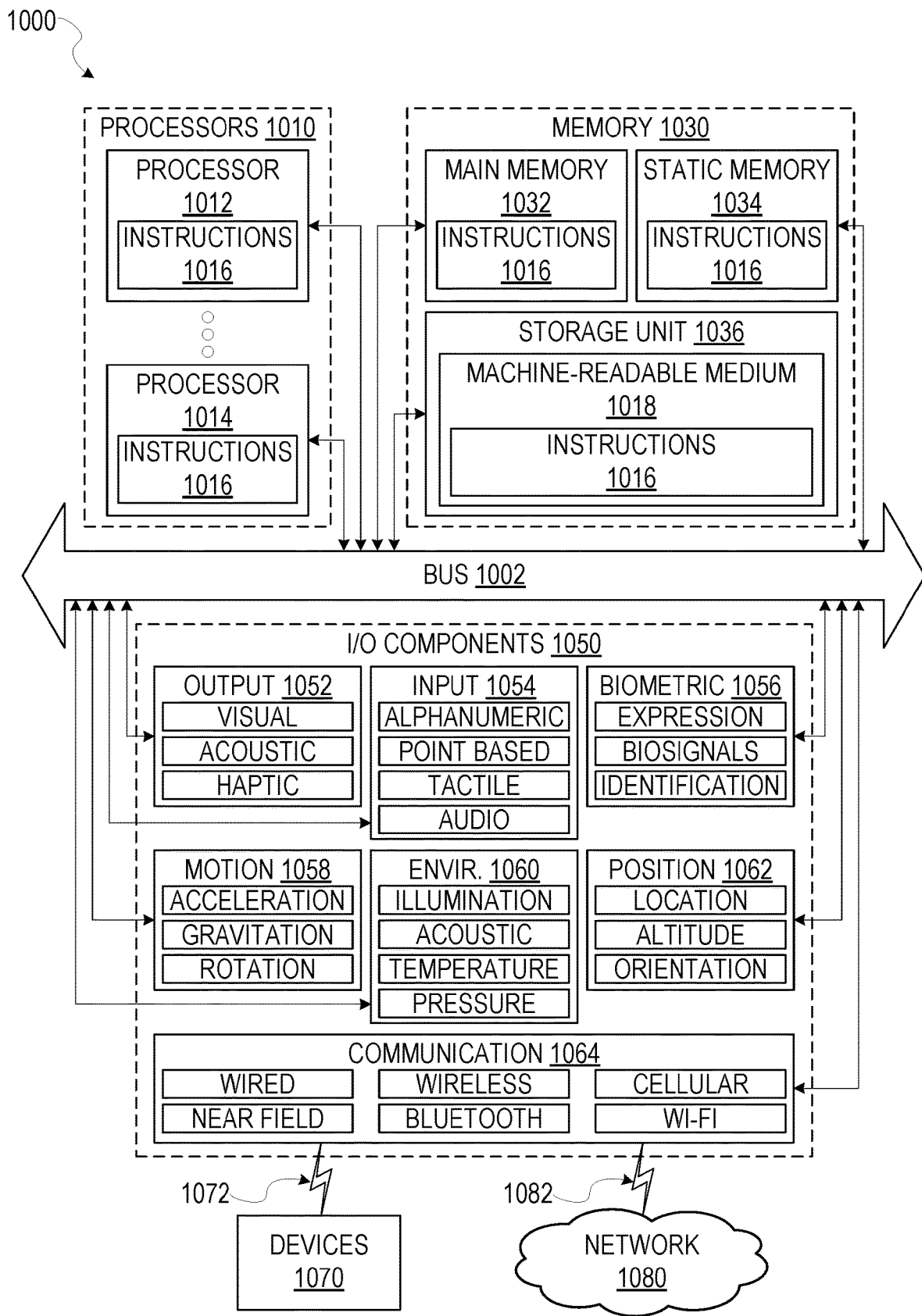
FIG. 10 illustrates a diagrammatic representation of a machine, in the form of a computer system, within which a set of instructions may be executed for causing the machine to perform any one or more of the methodologies discussed herein, according to an example embodiment.

FIG. 10 is a block diagram illustrating components of a machine 1000, according to some embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein can be executed. In alternative embodiments, the machine 1000 operates as a standalone device or can be coupled (e.g., networked) to other machines. In a networked deployment, the machine 1000 may operate in the capacity of a server machine, 108, 112, 116, 118, 122, 124, 128 and the like, or a client device 110 in a server-client network environment, or as a peer machine in a peer-to-peer (or distributed) network environment. The machine 1000 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

In various embodiments, the machine 1000 comprises processors 1010, memory 1030, and I/O components 1050, which can be configured to communicate with each other via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RC), another processor, or any suitable combination thereof) include, for example, a processor 1012 and a processor 1014 that may execute the instructions 1016. The term "processor" is intended to include multi-core processors 1010 that may comprise two or more independent processors 1012, 1014 (also referred to as "cores") that can execute instructions 1016 contemporaneously. Although FIG. 10 shows multiple processors 1010, the machine 1000 may include a single processor 1010 with a single core, a single processor 1010 with multiple cores (e.g., a multi-core processor 1010), multiple processors 1012, 1014 with a single core, multiple processors 1012, 1014 with multiple cores, or any combination thereof.

The memory 1030 comprises a main memory 1032, a static memory 1034, and a storage unit 1036 accessible to the processors 1010 via the bus 1002, according to some embodiments. The storage unit 1036 can include a machine-readable medium 1018 on which are stored the instructions 1016 embodying any one or more of the methodologies or functions described herein. The instructions 1016 can also reside, completely or at least partially, within the main memory 1032, within the static memory 1034, within at least one of the processors 1010 (e.g., within the processor's cache memory), or any suitable combination thereof, during execution thereof by the machine 1000. Accordingly, in various embodiments, the main memory 1032, the static memory 1034, and the processors 1010 are considered machine-readable media 1018.

As used herein, the term "memory" refers to a machine-readable medium 1018 able to store data temporarily or permanently and may be taken to include, but not be limited to, random-access memory (RAM), read-only memory (ROM), buffer memory, flash memory, and cache memory. While the machine-readable medium 1018 is shown, in an example embodiment, to be a single medium, the term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., instructions 1016) for execution by a machine (e.g., machine 1000), such that the instructions 1016, when executed by one or more processors of the machine 1000 (e.g., processors 1010), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1050 include a wide variety of components to receive input, provide output, produce output, transmit information, exchange information, capture measurements, and so on. In general, it will be appreciated that the I/O components 1050 can include many other components that are not shown in FIG. 10. The I/O components 1050 are grouped according to functionality merely for simplifying the following discussion, and the grouping is in no way limiting. In various example embodiments, the I/O components 1050 include output components 1052 and input components 1054. The output components 1052 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1054 include alphanumeric input components a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1050 include biometric components 1056, motion components 1058, environmental components 1060, or position components 1062, among a wide array of other components. For example, the biometric components 1056 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 include acceleration sensor components (e.g., accelerometer), gravitation sensor components, rotation sensor components (e.g., gyroscope), and so forth. The environmental components 1060 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1062 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 include a network interface component or another suitable device to interface with the network 1080. In further examples, communication components 1064 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1070 may be another machine 1000 or any of a wide variety of peripheral devices (e.g., a peripheral device coupled via a Universal Serial Bus (USB)).

Moreover, in some embodiments, the communication components 1064 detect identifiers or include components operable to detect identifiers. For example, the communication components 1064 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1064, such as location via Internet Protocol (IP) geolocation, location via WI-FI® signal triangulation, location via detecting a BLUETOOTH® or NFC beacon signal that may indicate a particular location, and so forth.

In various example embodiments, one or more portions of the network 1080 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1016 are transmitted or received over the network 1080 using a transmission medium via a network interface device (e.g., a network interface component included in the communication components 1064) and utilizing any one of a number of well-known transfer protocols (e.g., Hypertext Transfer Protocol (HTTP)). Similarly, in other example embodiments, the instructions 1016 are transmitted or received using a transmission medium via the coupling 1072 (e.g., a peer-to-peer coupling) to the devices 1070. The term "transmission medium" shall be taken to include any intangible medium that is capable of storing, encoding, or carrying the instructions 1016 for execution by the machine 1000, and includes digital or analog communications signals or other intangible media to facilitate communication of such software.

Furthermore, the machine-readable medium 1018 is non-transitory (in other words, not having any transitory signals) in that it does not embody a propagating signal. However, labeling the machine-readable medium 1018 "non-transitory" should not be construed to mean that the medium is incapable of movement; the machine-readable medium 1018 should be considered as being transportable from one physical location to another. Additionally, since the machine-readable medium 1018 is tangible, the machine-readable medium 1018 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    generating, by a computing system comprising a hardware processor, a trained machine learning model using training data generated from extracted queries and user interactions associated with media collections related to the queries;
    receiving, by the computing system, a query for relevant media collections in a messaging system;
    determining, by the computing system, a subset of media collections of a plurality of media collections for the query based on query features for the query;
    analyzing, by the computing system, the subset of the plurality of media collections to extract visual concepts from individual images and video contained in each of the subset media of collections of the plurality of media collections; and
    generating, by the computing system using the trained machine learning model, a semantic matching score for each media collection of the subset of the plurality of media collections based on matching the query features to the visual concepts for each media collection of the subset of the plurality of media collections.

2. The method of claim 1, wherein the queries and user interactions are extracted from user data generated by a plurality of computing device associated with a plurality of users in the messaging system.

3. The method of claim 1, wherein the semantic matching score is used to rank the plurality of media collections.

4. The method of claim 1, wherein the query is received from a computing device, and the method further comprises:
    returning a rank of the plurality of media collections to the computing device, wherein the computing device displays a list of the media collections in the order of the rank.

5. The method of claim 1, wherein the query features comprise terms in the query, terms associated with terms in the query, and location information associated with a computing device that sent the query.

6. The method of claim 1, further comprising:
    extracting location and caption features associated with individual images and video and wherein the semantic matching score is further generated using the extracted location and caption features.

7. The method of claim 1, wherein the visual concepts are extracted from the individual images and video using an object recognition model to determine visual concepts associated with media content items within each media collection.

8. A system comprising:
    one or more hardware processors; and
    a computer-readable medium storing instructions that are executable by the one or more hardware processors to cause the system to perform operations comprising:
    generating a trained machine learning model using training data generated from extracted queries and user interactions associated with media collections related to the queries;
    receiving a query for relevant media collections in a messaging system;
    determining a subset of media collections of a plurality of media collections for the query based on query features for the query;
    analyzing the subset of the plurality of media collections to extract visual concepts from individual images and video contained in each of the subset media of collections of the plurality of media collections; and
    generating, using the trained machine learning model, a semantic matching score for each media collection of the subset of the plurality of media collections based on matching the query features to the visual concepts for each media collection of the subset of the plurality of media collections.

9. The system of claim 8, wherein the queries and user interactions are extracted from user data generated by a plurality of computing device associated with a plurality of users in the messaging system.

10. The system of claim 8, wherein the semantic matching score is used to rank the plurality of media collections.

11. The system of claim 8, wherein the query is received from a computing device, and the operations further comprise:

returning a rank of the subset of media collections of the plurality of media collections to the computing device, wherein the computing device displays a list of the subset of media collections in the order of the rank.

12. The system of claim 8, wherein the query features comprise terms in the query, terms associated with terms in the query, and location information associated with a computing device that sent the query.

13. The system of claim 8, the operations further comprising:

extracting location and caption features associated with individual images and video and wherein the semantic matching score is further generated using the extracted location and caption features.

14. The system of claim 8, wherein the visual concepts are extracted from the individual images and video using an object recognition model to determine visual concepts associated with media content items within each media collection.

15. A non-transitory computer-readable medium comprising instructions stored thereon that are executable by at least one processor to cause a computing device to perform operations comprising:

generating a trained machine learning model using training data generated from extracted queries and user interactions associated with media collections related to the queries;

receiving a query for relevant media collections in a messaging system;

determining a subset of media collections of a plurality of media collections for the query based on query features for the query;

analyzing the subset of the plurality of media collections to extract visual concepts from individual images and video contained in each of the subset media of collections of the plurality of media collections; and generating, using the trained machine learning model, a semantic matching score for each media collection of the subset of the plurality of media collections based on matching the query features to the visual concepts for each media collection of the subset of the plurality of media collections.

16. The non-transitory computer-readable medium of claim 15, wherein the visual concepts are extracted from the individual images and video using an object recognition model to determine visual concepts associated with media content items within each media collection.

17. The method of claim 1, further comprising:

generating an aggregated vector of visual concepts for each media collection of the subset of media collections.

18. The method of claim 1, further comprising:

projecting the query features and the aggregated vector of visual concepts of the subset of media collections within a semantic vector space; and wherein matching the query features to the visual concepts of the subset of media collections is performed my measuring a similarity of the query features and aggregated vector of visual concepts for each media collection within the semantic vector space.

19. The method of claim 1, wherein the subset of media collections is determined based on at least a partial or fuzzy match of the query and the title of a media collection.

20. The method of claim 1, wherein the subset of media collections is determined based on at least a location associated with each media collection, a location associated with the individual images or videos contained in each media collections, or a location of an event associated with each media collection.

* * * * *